(12) United States Patent
Ballantine et al.

(10) Patent No.: US 12,308,484 B2
(45) Date of Patent: May 20, 2025

(54) METHODS OF MANUFACTURING A GAS DIFFUSION LAYER AND AN ELECTROCHEMICAL CELL INCORPORATING THE SAME

(71) Applicants: OHMIUM INTERNATIONAL, Inc., Incline Village, NV (US); INFINITY FUEL CELL AND HYDROGEN, INC., Windsor, CT (US)

(72) Inventors: Arne Ballantine, Incline Village, NV (US); Chockkalingam Karuppaiah, Fremont, CA (US); William F. Smith, Windsor, CT (US)

(73) Assignees: INFINITY FUEL CELL AND HYDROGEN, INC., Windsor, CT (US); Ohmium International, Inc., Newark, CA (US)

( * ) Notice: Subject to any disclaimer, the term of this patent is extended or adjusted under 35 U.S.C. 154(b) by 817 days.

(21) Appl. No.: 17/466,766

(22) Filed: Sep. 3, 2021

(65) Prior Publication Data

US 2022/0077475 A1    Mar. 10, 2022

Related U.S. Application Data

(60) Provisional application No. 63/074,866, filed on Sep. 4, 2020.

(51) Int. Cl.
| | | |
|---|---|---|
| H01M 8/0232 | (2016.01) | |
| B22F 1/00 | (2022.01) | |
| B22F 1/10 | (2022.01) | |
| B22F 3/10 | (2006.01) | |
| C22C 38/02 | (2006.01) | |
| C22C 38/40 | (2006.01) | |
| H01M 8/10 | (2016.01) | |

(52) U.S. Cl.
CPC ............. *H01M 8/0232* (2013.01); *B22F 1/10* (2022.01); *B22F 3/1021* (2013.01); *B22F 2301/35* (2013.01); *B22F 2998/10* (2013.01); *C22C 38/02* (2013.01); *C22C 38/40* (2013.01); *H01M 2008/1095* (2013.01)

(58) Field of Classification Search
CPC ......... H01M 8/0232; H01M 2008/1095; B22F 1/10; B22F 3/1021; B22F 2301/35; B22F 2998/10; B22F 2003/023; B22F 2003/033; B22F 2999/00; B22F 5/006; C22C 38/02; C22C 38/40; Y02E 60/50; Y02P 70/50
See application file for complete search history.

(56) References Cited

U.S. PATENT DOCUMENTS

| | | | |
|---|---|---|---|
| 4,619,753 A | 10/1986 | Christen et al. | |
| 7,871,733 B2 | 1/2011 | Ikeda et al. | |
| 8,669,499 B2 | 3/2014 | Conrad | |
| 9,118,040 B2 | 8/2015 | Smith et al. | |
| 9,325,022 B2 | 4/2016 | Okuyama et al. | |
| 9,461,311 B2 | 10/2016 | Lu | |
| 10,287,695 B2 | 5/2019 | Blanchet et al. | |
| 10,707,494 B2 | 7/2020 | Kawashima | |
| 11,139,499 B2 | 10/2021 | Lee et al. | |
| 2001/0021470 A1 | 9/2001 | May et al. | |
| 2004/0081881 A1 | 4/2004 | Vyas et al. | |
| 2004/0241063 A1 | 12/2004 | Appleby et al. | |
| 2006/0234111 A1* | 10/2006 | Gulla ................. | H01M 4/8825 429/534 |
| 2009/0293262 A1 | 12/2009 | Shimamune | |
| 2010/0015485 A1 | 1/2010 | Conti et al. | |
| 2010/0089746 A1 | 4/2010 | Chang | |
| 2010/0143817 A1 | 6/2010 | Bang et al. | |
| 2010/0273094 A1 | 10/2010 | Li et al. | |
| 2010/0273095 A1 | 10/2010 | Li et al. | |
| 2011/0081591 A1 | 4/2011 | Scherer et al. | |
| 2013/0095251 A1 | 4/2013 | Dadheech et al. | |
| 2013/0175164 A1 | 7/2013 | Smith et al. | |
| 2013/0230793 A1 | 9/2013 | Wang | |
| 2014/0329168 A1 | 11/2014 | Daimler et al. | |
| 2015/0354072 A1 | 12/2015 | Suchsland | |
| 2016/0197388 A1 | 7/2016 | Kogan et al. | |
| 2019/0296362 A1 | 9/2019 | Mei et al. | |
| 2019/0393518 A1 | 12/2019 | Volkswagen et al. | |
| 2020/0216968 A1 | 7/2020 | Hunegnaw et al. | |
| 2021/0050603 A1 | 2/2021 | Aperam et al. | |
| 2021/0155491 A1 | 5/2021 | Ballantine et al. | |
| 2021/0156038 A1 | 5/2021 | Ballantine et al. | |
| 2021/0156039 A1 | 5/2021 | Ballantine et al. | |
| 2021/0179451 A1 | 6/2021 | Ballantine et al. | |
| 2021/0179471 A1 | 6/2021 | Ballantine et al. | |
| 2021/0262098 A1 | 8/2021 | Wang | |
| 2022/0023946 A1 | 1/2022 | Ballentine | |

(Continued)

FOREIGN PATENT DOCUMENTS

| | | |
|---|---|---|
| AU | 2022287900 | 11/2023 |
| CN | 101796677 | 8/2010 |

(Continued)

OTHER PUBLICATIONS

U.S. Appl. No. 17/402,821 Final Office Action dated Jul. 16, 2024.
AZO Materials, "Powder Metallurgy—Component Manufacture by Uniaxial Pressing," https://www.azom.com/article.aspx?ArticleID=155, visited Jul. 23, 2021.
Ballantine, A. et al., "Porous Electrolyzer Gas Diffusion Layer and Method of Making Thereof," U.S. Appl. No. 17/384,033, filed Jul. 23, 2021.
Bensebaa, F., "Nanoparticle Assembling and System Integration," Interface Science and Technology, Chapter 4, vol. 19, pp. 185-277, (2013); DOI:10.1016/B978-0-12-369550-5.00004-5.
Bolton, J.D. et al., "Silicide Phase Formation and Its Influence on Liquid Phase Sintering in 316L Stainless Steel with Elemental Silicon Additions," Powder Metallurgy, vol. 41, No. 2, pp. 93-101, (1998); DOI: 10.1179/pom.1998.41.2.93 https://www.tandfonline.com/doi/abs/10.1179/pom.1998.41.2.93.

(Continued)

*Primary Examiner* — Muhammad S Siddiquee
(74) *Attorney, Agent, or Firm* — Polsinelli LLP

(57) ABSTRACT

An anode gas diffusion layer for a proton exchange membrane (PEM) electrolyzer includes a porous stainless steel sheet formed by a powder metallurgical technique.

11 Claims, 5 Drawing Sheets

(56) References Cited

U.S. PATENT DOCUMENTS

| | | | |
|---|---|---|---|
| 2022/0049367 A1 | 2/2022 | Ballentine | |
| 2022/0081780 A1* | 3/2022 | Nakaue | C01B 3/00 |
| 2022/0396888 A1 | 12/2022 | Karuppaiah | |
| 2023/0231151 A1 | 7/2023 | Wegener | |

FOREIGN PATENT DOCUMENTS

| | | | |
|---|---|---|---|
| CN | 104167560 | 11/2014 | |
| CN | 107200583 A | 9/2017 | |
| CN | 111408725 | 7/2020 | |
| DE | 19647534 | 5/1998 | |
| DE | 202014008157 U1 | 1/2016 | |
| EP | 1813688 A1 | 8/2007 | |
| EP | 3939722 A1 * | 1/2022 | B22F 1/0074 |
| EP | 4189144 A1 | 6/2023 | |
| EP | 4196627 A1 | 6/2023 | |
| EP | 4352282 A1 | 4/2024 | |
| JP | H10251711 A | 9/1998 | |
| JP | 2002275676 A | 9/2002 | |
| JP | 2004068112 A | 3/2004 | |
| JP | 2004071456 A | 3/2004 | |
| JP | 2006138005 A | 6/2006 | |
| JP | 2009102701 A | 5/2009 | |
| JP | 5040584 | 10/2012 | |
| JP | 2016081770 A | 5/2016 | |
| JP | 2023535767 A | 8/2023 | |
| JP | 2023538306 A | 9/2023 | |
| JP | 2024521299 A | 5/2024 | |
| TW | 2020-08636 | 2/2020 | |
| TW | 202214913 | 4/2022 | |
| TW | 202225488 A | 7/2022 | |
| TW | 202314044 A | 4/2023 | |
| WO | 2018236649 A1 | 12/2018 | |
| WO | WO 2018/224448 | 12/2018 | |
| WO | WO 2022/026332 | 2/2022 | |
| WO | WO 2022/036311 | 2/2022 | |
| WO | WO 2022/260983 | 12/2022 | |

OTHER PUBLICATIONS

Chisholm, G. et al. "3D printed flow plates for the electrolysis of water: An economic and adaptable approach to device manufacture" Energy Environ. Sci., 2014, 7, 3026-3032; https://doi.org/10.1039/C4EE01426J.
Wikipedia, "Tape Casting," https://en.wikipedia.org/wiki/Tape_casting, visited Jul. 23, 2021.
U.S. Appl. No. 17/402,821 Office Action dated Dec. 7, 2023.
PCT Application No. PCT/US2022/032316 International Preliminary Report on Patentability dated Dec. 21, 2023.
U.S. Appl. No. 17/384,033 Office Action dated Mar. 12, 2024.
Chen et al., "Two-phase transport in the cathode gas diffusion layer of PEM fuel cell with a gradient in porosity," International Journal of Hydrogen Energy 33 (2008) pp. 2525-2529.
Lettenmeier et al., "Towards developing a backing layer for proton exchange membrane electrolyzers," Journal of Power Sources 311 (2016) pp. 153-158.
Lettenmeier et al. "Comprehensive investigation of novel pore-graded gas diffusion layers for high-performance and cost-effective proton exchange membrane electrolyzers" Energy & Environmental Science, vol. 10, No. 12, Dec. 2017, pp. 2521-2533.
Ijaodola et al., "Evaluating the Effect of Metal Bipolar Plate Coating on the Performance of Proton Exchange Membrane Fuel Cells" energies, vol. 11 (Nov. 18, 2018): pp. 1-28; p. 8-p. 13.
Mo, J. et al., "Investigation of titanium felt transport parameters for energy storage and hydrogen/oxygen production", In: AIAA Propulsion and Energy Forum, 13th International Energy Conversion Engineering Conference, 2015, AIAA paper 2015-3914, pp. 1-9.
Shbeh, M. M. et al., "Open celled porous titanium", Advanced engineering materials, 2017, vol. 19, No. 11, pp. 1600664(2)-1600664(17).
PCT Application No. PCT/US2021/043047 International Preliminary Report on Patentability dated Jan. 31, 2023.
PCT Application No. PCT/US2021/043047 International Search Report and Written Opinion dated Nov. 12, 2021.
PCT Application No. PCT/US2021/046113 International Search Report and Written Opinion dated Dec. 6, 2021.
PCT Application No. PCT/US2022/032316 International Search Report and Written Opinion dated Aug. 26, 2022.
EP Application No. 21851336.4 Extended Search Report dated Sep. 13, 2024.
Hackemüller, F. J. et al., "Manufacturing of Large-Scale Titanium-Based Porous Transport Layers for Polymer Electrolyte Membrane Electrolysis by Tape Casting," Advanced Engineering Materials, 2019, 10 pages.
Schuler, T. et al., "Hierarchically Structured Porous Transport Layers for Polymer Electrolyte Water Electrolysis," Advanced Energy Materials, 2020, 12 pages.
Xing et al., "Homogenization of current density of PEM fuel cells by in-plane graded distributions of platinum loading and GLD porosity," Chemical Engineering Science 192 (2018), 699-713, (Year: 2018).
U.S. Appl. No. 17/384,033 Non-Final Office Action dated Mar. 20, 2025.
U.S. Appl. No. 17/384,033 Final Office Action dated Aug. 27, 2024.
U.S. Appl. No. 17/833,018 Final Office Action dated Mar. 19, 2025.
U.S. Appl. No. 17/833,018 Non-Final Office Action dated Sep. 26, 2024.
TW Application No. 110130178 Office Action dated Jan. 20, 2025.
PCT Application No. PCT/US2021/046113, International Preliminary Report on Patentability dated Feb. 23, 2023.

* cited by examiner

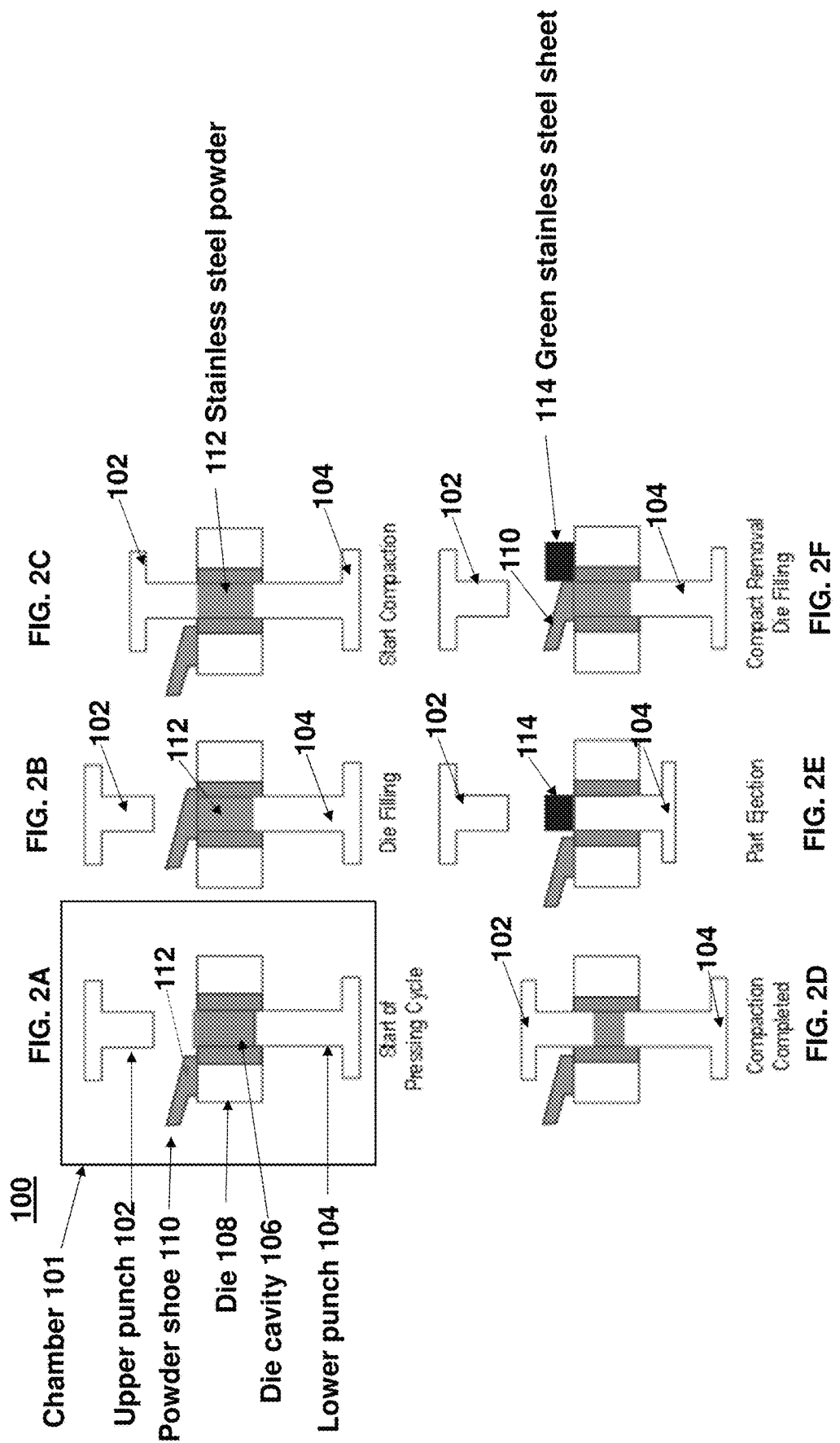

METHODS OF MANUFACTURING A GAS DIFFUSION LAYER AND AN ELECTROCHEMICAL CELL INCORPORATING THE SAME

CROSS-REFERENCE TO RELATED APPLICATION

This application claims the benefit of Provisional Patent Application No. 63/074,866, filed on Sep. 4, 2020, the entire contents of which are incorporated herein by reference.

FIELD

This disclosure is directed to electrolyzers in general and, in particular, to a gas diffusion layer for an electrolyzer and method of making thereof.

BACKGROUND

Proton exchange membrane (PEM) electrolyzers may be used to convert water into separate hydrogen and oxygen streams. Such PEM electrolyzers include a PEM polymer electrolyte located between an anode and a cathode. Anode side and cathode side porous gas diffusion layers are located adjacent to the respective anode and cathodes.

SUMMARY

In one embodiment, an anode gas diffusion layer for a PEM electrolyzer may include a porous stainless steel sheet formed by a powder metallurgical technique.

In another embodiment, a PEM electrolyzer includes an anode side flow plate, a cathode side flow plate, and a PEM polymer electrolyte located between the anode side flow plate and the cathode side flow plate. The PEM electrolyzer may further include an anode gas diffusion layer including a porous stainless steel sheet or a porous niobium sheet located between the PEM polymer electrolyte and the anode side flow plate, an anode located between the anode gas diffusion layer and the electrolyte, a cathode gas diffusion layer located between the electrolyte and the cathode side flow plate, and a cathode located between the cathode gas diffusion layer and the electrolyte.

In another embodiment, a method of making a porous stainless steel sheet configured to function as water/gas separator for a PEM electrolyzer by a powder metallurgical technique includes providing a mixture of stainless steel powder and lubricant into a die cavity, compressing the mixture of stainless steel powder and lubricant in the die cavity to form a green sheet, de-binding the green sheet, and sintering the green sheet to form the porous stainless steel sheet.

BRIEF DESCRIPTION OF THE DRAWINGS

Aspects of this disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2A illustrates a first configuration of a powder metallurgy apparatus used to fabricate an anode gas diffusion layer for a PEM electrolyzer, according to various embodiments.

FIG. 2B illustrates a second configuration of a powder metallurgy apparatus used to fabricate an anode gas diffusion layer for a PEM electrolyzer, according to various embodiments.

FIG. 2C illustrates a third configuration of a powder metallurgy apparatus used to fabricate an anode gas diffusion layer for a PEM electrolyzer, according to various embodiments.

FIG. 2D illustrates a fourth configuration of a powder metallurgy apparatus used to fabricate an anode gas diffusion layer for a PEM electrolyzer, according to various embodiments.

FIG. 2E illustrates a fifth configuration of a powder metallurgy apparatus used to fabricate an anode gas diffusion layer for a PEM electrolyzer, according to various embodiments.

FIG. 2F illustrates a sixth configuration of a powder metallurgy apparatus used to fabricate an anode gas diffusion layer for a PEM electrolyzer, according to various embodiments.

DETAILED DESCRIPTION

The disclosed embodiments are described more fully hereinafter with reference to the accompanying drawings, in which exemplary embodiments are shown. The foregoing may, however, be embodied in many different forms and should not be construed as being limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

Figure 1A:
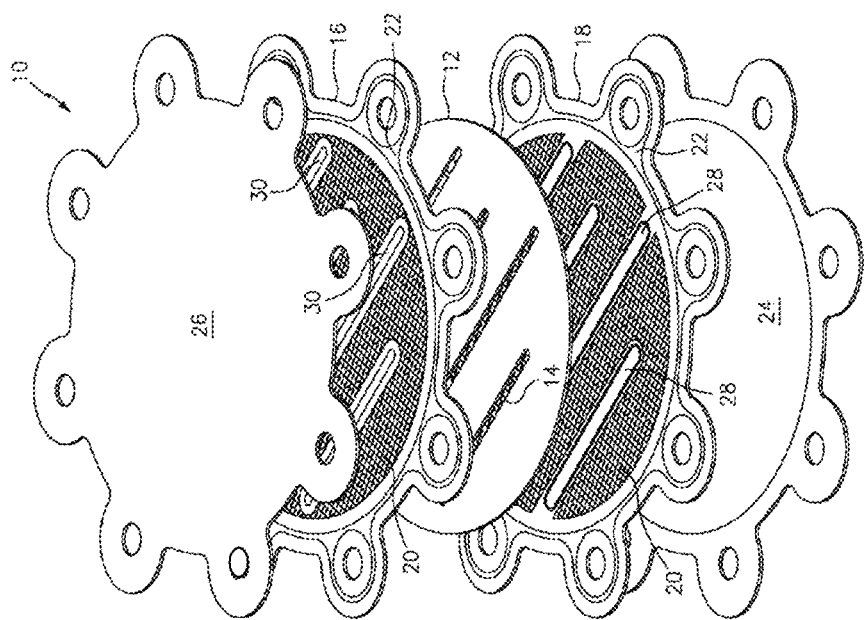
FIG. 1A is a perspective cut-away view of a component of a PEM fuel cell.

FIG. 1A illustrates a perspective cut-away view of a PEM fuel cell stack that is described in U.S. Pat. No. 9,118,040. It shows an exploded view of an exemplary "active area current collection" embodiment of the PEM fuel cell showing a water/gas porous separator with through-holes, the through-holes allowing contact between two mating structures found on a water chamber or flow field and on an oxygen screen/frame assembly.

As described in U.S. Pat. No. 9,118,040, the PEM fuel cell of FIG. 1A, reference numeral 10 has been used to generally designate one embodiment of the fuel cell or fuel cell stack, while reference numeral 12 has been used to generally designate one embodiment of the water/gas porous separator 12 which is made of an electrically insulating polymer material. The porous separator 12 is shown with a series of parallel, elongate, oval-shaped through-holes 14. A water chamber or flowfield 16 (with a mating structure) is located on one side of separator 12, while an oxygen screen/frame assembly 18 (with a complimentary mating structure) is located on an opposing side, thereby forming a so-called water transport assembly. Generally speaking, the water chamber or flowfield 16 and the oxygen screen/frame assembly 18 both include a central portion 20 having a multitude of fluid-flow spaces and a frame portion 22 integral with and circumferentially surrounding the central portion 20. The diameter of porous separator 12 is slightly larger than the diameter of the central portions 20 of the water chamber or flowfield 16 and the oxygen screen/frame assembly 18. A membrane electrode assembly (MEA) 24 containing a polymer electrolyte having anode and cathode electrodes on its opposing major surfaces is shown on an opposing side of the oxygen screen/frame assembly 18, while a solid separator sheet 26 is shown on an opposing side of the water chamber or flowfield 16.

The oxygen screen/frame assembly 18 shown in FIG. 1A, which is preferably a diffusion bonded laminar assembly, has a series of bonded (e.g., diffusion bonded) conductive tongue extensions 28 along an upper surface that mate with a series of conductive strips 30 bonded (e.g., diffusion bonded) onto a lower surface of the central portion 20 of the water chamber or flowfield 16. Upon assembly of the inventive fuel cell or fuel cell stack, these mating structures 28, 30 will physically contact each other through the through-holes 14 provided in the porous separator 12, thereby forming an electrical pathway between the conductive oxygen screen/frame assembly 18 and the conductive water chamber or flowfield 16. In this embodiment, current flows through the active area of the cell. An insulating sealing gasket (e.g., a TEFLON® gasket) (not shown) is positioned between the frame portion 22 of the oxygen screen/frame assembly 18 and the frame portion 22 of the water chamber or flowfield 16 to insure a uniform fit and seal between these components.

Thus, the electrically insulating porous separator 12 that is described in U.S. Pat. No. 9,118,040 requires formation of through-holes 14 to establish electrical contact of the mating structures 28, 30, which adds extra expense and fabrication steps in the fuel cell stack 10.

Figure 1B:
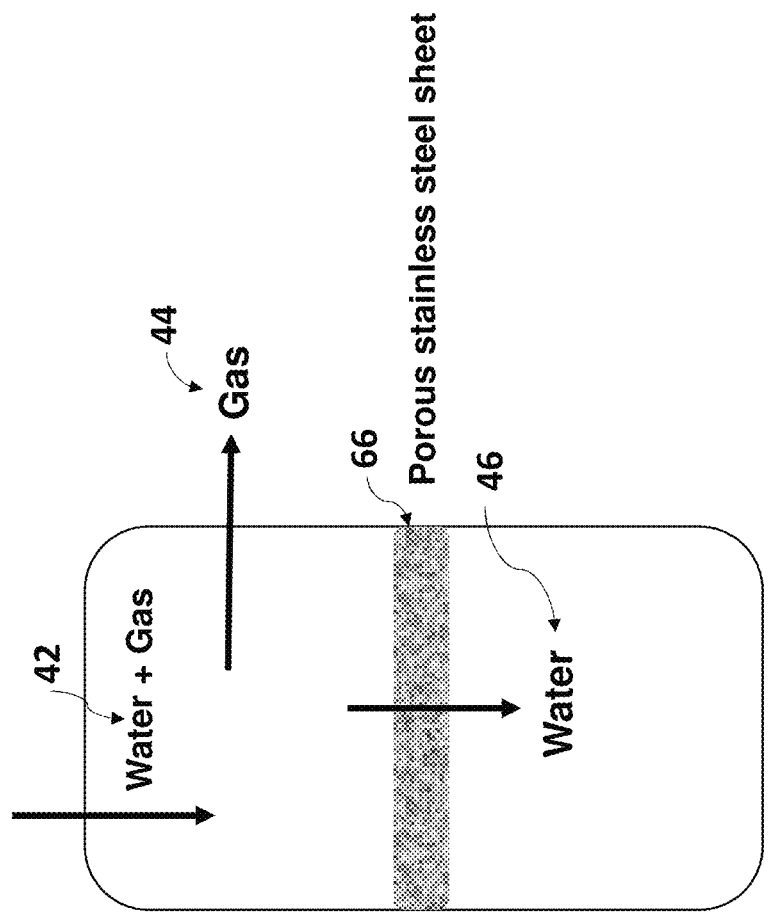
FIG. 1B is a schematic side cross-sectional view of an anode gas diffusion layer, according to various embodiments.

FIG. 1B is a schematic side cross-sectional view of an anode gas diffusion layer 66, according to various embodiments. The anode gas diffusion layer 66 may be used in place of the water/gas porous separator 12 of FIG. 1A in a PEM electrolyzer cell. According to an embodiment, the anode gas diffusion layer 66 may include an electrically conductive, porous stainless steel sheet formed by powder metallurgy, as described in greater detail with reference to FIGS. 2A to 2F, below. The anode gas diffusion layer 66 does not require formation of through-holes 14 or mating structures 28, 30 that connect to one another in the through-holes 14, in contrast to the embodiment of FIG. 1A. Thus, the anode gas diffusion layer 66 may be simpler to fabricate than the water/gas porous separator 12. Similarly, an electrolyzer stack including the anode gas diffusion layer 66 may have fewer fabrication operations and may avoid potential problems with misalignment of the mating structures 28, 30.

As shown in FIG. 1B, the anode gas diffusion layer 66, which may include a stainless steel sheet (e.g., plate or plate-shaped sheet), may allow water 46 to pass through the stainless steel sheet preferentially to gas 44. Thus, as shown in FIG. 1B, water and gas mixture 42 may be separated into water 46, which passes through the anode gas diffusion layer 66 to a second side of the anode gas diffusion layer 66, and gas 44 that remains on the first side of the anode gas diffusion layer 66. The anode gas diffusion layer 66 may be used in a PEM electrolyzer or electrolyzer stack. The anode gas diffusion layer 66 may also be used in other systems having different configurations. For example, a different configuration for a PEM electrolyzer 50, which may include the anode gas diffusion layer 66 is described with reference to FIG. 1C, below.

Figure 1C:
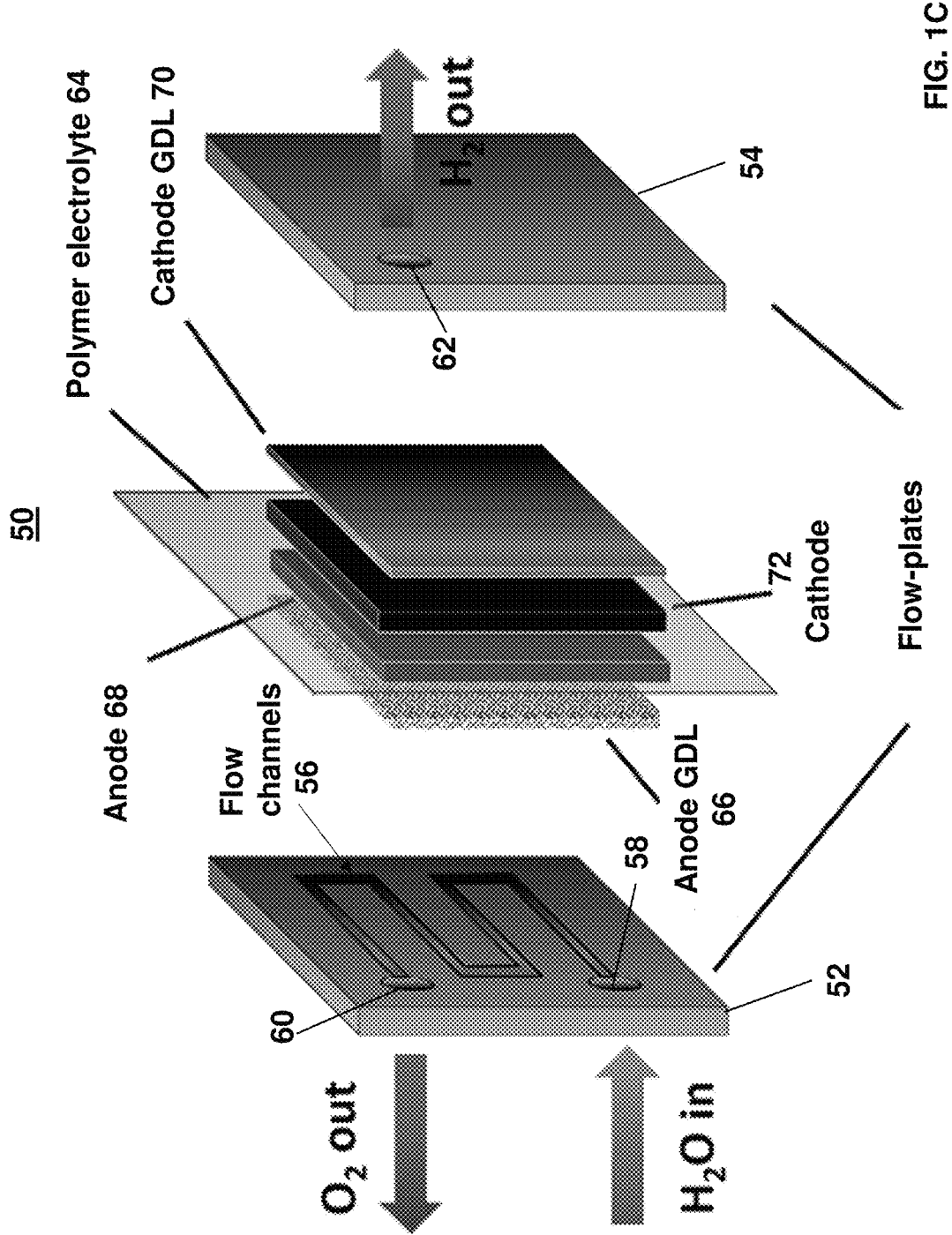
FIG. 1C is a perspective cut-away view of a PEM electrolyzer including gas diffusion layers.

FIG. 1C illustrates a perspective cut-away view of a PEM electrolyzer 50 that is described in an article by Greig Chisholm et al. "3D printed flow plates for the electrolysis of water: An economic and adaptable approach to device manufacture" Energy Environ. Sci., 2014, 7, 3026-3032. The PEM electrolyzer 50 may include an anode side flow plate 52, having a fluid flow channel 56, a cathode side flow plate 54, and respective openings 58, 60, 62; a polymer electrolyte 64 located between the flow plates 52, 54; an anode gas diffusion layer 66 located between the polymer electrolyte 64 and the anode side flow plate 52; an anode 68 located between the anode gas diffusion layer 66 and the polymer electrolyte 64; a cathode gas diffusion layer 70 located between the polymer electrolyte 64 and the cathode side flow plate 54; and a cathode 72 located between the cathode gas diffusion layer 70 and the polymer electrolyte 64.

The anode side flow plate 52 may include a water inlet opening 58, an oxygen outlet opening 60, and the fluid flow channel 56 (e.g. a tortuous path groove) connecting the water inlet opening 58 and the oxygen outlet opening 60 in the side of the anode side flow plate 52 facing the anode gas diffusion layer 66. The fluid flow channel 56 may be located on a surface of the anode side flow plate that is configured to face the anode gas diffusion layer 66.

The anode gas diffusion layer 66 may include a porous stainless steel layer, as described in greater detail below. The cathode gas diffusion layer 70 may include a porous carbon layer. The anode 68 may include any suitable anode catalyst, such as an iridium layer. The cathode 72 may include any suitable cathode catalyst, such as a platinum layer. Other noble metal catalyst layers may also be used for the anode and/or cathodes. The polymer electrolyte 64 may include any suitable proton exchange (e.g., hydrogen ion transport) polymer membrane, such as a Nafion® membrane, which may include a sulfonated tetrafluoroethylene based fluoropolymer-copolymer having a formula $C_7HF_{13}O_5SC_2F_4$.

In operation, water is provided into the fluid flow channel 56 through the water inlet opening 58. The water flows through the fluid flow channel 56 and through the anode gas diffusion layer 66 to the anode 68. The water is electrochemically separated into oxygen and hydrogen at the anode 68 upon application of an external current or voltage between the anode 68 and the cathode 72. The oxygen diffuses back through the anode gas diffusion layer 66 to the anode side flow plate 52 and exits the PEM electrolyzer 50 through the oxygen outlet opening 60. Hydrogen ions diffuse through the polymer electrolyte 64 to the cathode 72 and then exit the PEM electrolyzer 50 through the cathode gas diffusion layer 70 and the hydrogen outlet opening 62 in the cathode side flow plate 54.

A porous stainless steel layer (e.g., sheet) may be used as the anode gas diffusion layer 66 (i.e., transport layer). Conventional porous stainless steel sheet production methods include tape casting and screen printing followed by sintering. Stainless steels are a family of iron-based alloys that contain a minimum of approximately 11% chromium, and also include carbon (e.g., from 0.03% to greater than 1.00%), and one or more of nitrogen, aluminum, silicon, sulfur, titanium, nickel, copper, selenium, niobium, and/or molybdenum.

In other embodiments, the porous stainless steel layer (e.g., sheet) that is used as the anode gas diffusion layer 66 is formed by a powder metallurgical technique, in which stainless steel powder is pressed into a porous stainless steel sheet using a compaction process. The compacted sheet is then sintered to yield the anode gas diffusion layer 66 with an established metallurgical bond. The porous stainless steel sheet may have a porosity in a range from approximately 40% to approximately 60%.

FIGS. 2A to 2F show exemplary configurations of a powder metallurgy press apparatus 100 in a powder metallurgy process (e.g., a technique illustrated on azom.com (https://www.azom.com/article.aspx?ArticleID=155)) that may be used to form the anode gas diffusion layer 66. The powder metallurgy press apparatus 100 may include a chamber 101 containing an upper punch 102 and a lower punch 104, which may be configured to move axially relative to a die cavity 106 located in a die 108.

Operations in a powder metallurgy compaction cycle may include lowering the lower punch 104 from an elevated position to expose a die cavity 106 as shown, for example, in FIGS. 2A and 2B. Stainless steel powder 112 may be mixed with a lubricant and then provided into a powder shoe 110. The powder shoe 110 containing the stainless steel powder 112 mixed with the lubricant, may move over the die cavity 106 to thereby fill the die cavity 106 with a mixture of stainless steel powder 112 and lubricant. After the powder shoe 110 is withdrawn, the upper punch 102 and/or the lower punch 104 may move relative to the die 108 to thereby compress the stainless steel powder 112, for example, as shown in FIGS. 2C and 2D. After compaction, the upper punch 102 may be retracted upwards and the lower punch 104 may move up relative to the die 108 to thereby eject a compacted green stainless steel sheet 114 from the die cavity 106, for example, as shown in FIG. 2E. The powder shoe 110 may then again move across the top surface of the die 108 to thereby refill the die cavity 106 with additional stainless steel powder 112 and lubricant mixture. The powder shoe 110 may then push the compacted green stainless steel sheet 114 out of the die 108, for example, as shown in FIG. 2F.

The compacted green stainless steel sheet 114 may be provided onto a moving belt (not shown) which moves the compacted green stainless steel sheet 114 through one or more belt furnaces (not shown). The compacted green stainless steel sheet 114 may first be annealed at a first temperature in a de-binding process to burn out the organic lubricant (i.e., binder), followed by annealing at a second (e.g., greater) temperature to sinter the de-lubricated stainless steel sheet. The resulting sintered porous stainless steel sheet may then be positioned in the electrolyzer (e.g., the PEM electrolyzer 50 of FIG. 1C) between the anode side flow plate 52 and the membrane electrode assembly (i.e., the polymer electrolyte 64 with anode 68 and cathode 72 located on opposite sides thereof) to function as the anode gas diffusion layer 66.

In one embodiment, the porosity of the anode gas diffusion layer 66 may be selected to provide a bubble point pressure of at least 10 pounds per square inch (psi), such as 10 to 60 psi. For example, the average pore size (e.g., diameter) may be less than 5 microns, such as 1 to 3 microns in the porous stainless steel sheet. While a porous stainless steel sheet is described above, in an alternative embodiment, the porous sheet may include a porous niobium sheet.

Figure 3:
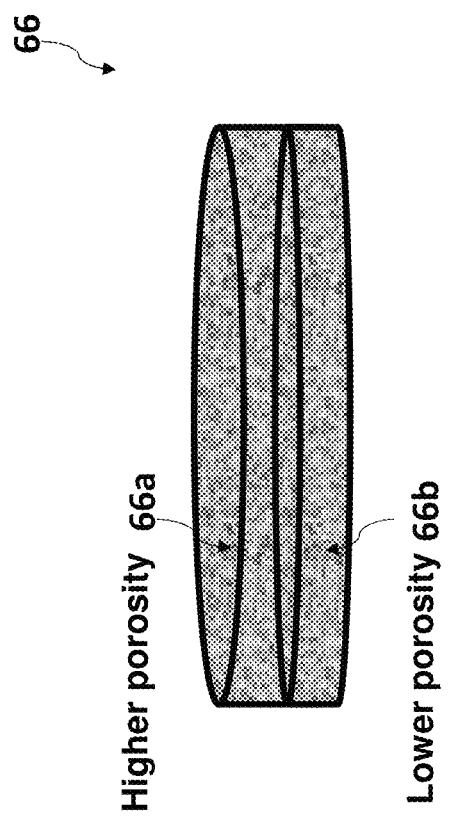
FIG. 3 is a perspective view of an anode gas diffusion layer, according to various embodiments.

In one embodiment shown in FIG. 3, a first major side 66a of the anode gas diffusion layer 66 may have a greater porosity than a second major side 66b of the anode gas diffusion layer 66. The first major side 66a of the anode gas diffusion layer 66 may be configured to face the anode side flow plate 52, and the second major side 66b of the anode gas diffusion layer 66 may be configured to face the anode 68 (e.g., see FIG. 1C). The first major side 66a of the anode gas diffusion layer 66 sheet may have a first porosity that is at least 10 percent greater than a second porosity of the second major side 66b of the anode gas diffusion layer 66. The first major side 66a of the anode gas diffusion layer 66 may have a porosity in a range from approximately 40% to approximately 50%, while the second major side 66b of the anode gas diffusion layer 66 may have a porosity in a range from approximately 50% to 60%. In one embodiment, the greater porosity on the first major side 66a of the anode gas diffusion layer 66 permits more water to enter the pores, while the lower porosity on the second major side 66b of the anode gas diffusion layer 66 provides an improved electrical contact with the anode 68.

The porosity difference may be a continuous porosity gradient in which the porosity increases continuously from the first major side 66a to the second major side 66b (i.e. between opposing major surfaces). Alternatively, the porosity may change in a stepwise fashion such that the first major side 66a and the second major side 66b of the anode gas diffusion layer 66 have different respective porosities from one another. To form different porosity regions, a different amount of lubricant may be added to top and bottom sections of the stainless steel powder 112 in the die cavity 106 in a continuous gradient or in a stepwise manner. The anode gas diffusion layer 66 may have a greater porosity in the first major side 66a that is made from a powder section containing a greater lubricant concentration than in the second major side 66b that is made from a powder section containing a lower lubricant concentration.

The lubricant concentration in the die cavity 106 may be formed by two or more different passes of the powder shoe 110 in which the stainless steel powder 112 to lubricant ratio is different (e.g., higher or lower) in different passes. The die cavity 106 may be partially filled during a first pass of the powder shoe 110 with a first portion of the mixture of the stainless steel powder 112 and lubricant having a first ratio of stainless steel powder 112 to lubricant. The die cavity 106 may then be further filled during a second pass of the powder shoe 110 with a second portion of the mixture of the stainless steel powder 112 and lubricant. The second portion may have a second ratio of stainless steel powder 112 to lubricant that is different from the first ratio. A lower ratio of stainless steel powder 112 to lubricant results in a higher porosity during the de-binding anneal operation.

In another embodiment, the formation of the anode gas diffusion layer 66 (e.g., see FIGS. 2A to 2F) may be carried out in an inert, low oxygen partial pressure atmosphere in the chamber 101. In this way, oxidation of stainless steel that generates stainless steel dioxide may be avoided, thus reducing resistive losses and avoiding a fire hazard due to heat generated by stainless steel oxidation. The inert atmosphere may include any suitable inert gas (e.g., a noble gas such as argon). The atmosphere may include an oxygen partial pressure of less than 0.1 atm, such as 0.0001 to 0.01 atm. The inert gas may be provided into the chamber 101 containing the die 108 and the punches 102, 104. Alternatively the inert gas may be provided into the die cavity 106 as a gas blanket from an inert gas conduit after filling the die cavity 106 with the stainless steel powder 112.

In another embodiment, a noble metal coating (e.g., gold or platinum group metal coating) may be formed on the anode gas diffusion layer 66 during the powder metallurgy process. Forming such a coating during the powder metallurgy process may streamline the process of forming such a coating and may further reduce a cost associated with the coating. To form a coating in this way, for example, a noble metal powder may be provided into the die cavity 106 below and above the stainless steel powder 112. The powder mixture may then be compressed using the upper punch 102 and the lower punch 104, as described above with reference to FIGS. 2A to 2F. Various powder layers may be formed by three or more different passes of the powder shoe 110 such that the powder composition varies with different passes of the powder shoe 110.

In an example embodiment, the die cavity 106 may be partially filled with a noble metal powder and lubricant mixture during a first pass of the powder shoe 110. Then, in a second pass of the powder shoe 110, the die cavity 106 may be additionally filled with a stainless steel powder 112 and lubricant mixture. Lastly, in a third pass the of the powder shoe 110, the die cavity 106 may be filed with a noble metal powder and lubricant mixture. The process may be simplified by using two or more powder shows 110 each having respective different powders or powder mixtures. For example, a first powder shoe 110 having the noble metal powder and lubricant mixture may be used during the first and the third passes. Similarly, a second powder shoe 110 filled with the stainless steel powder and lubricant mixture may be used during the second shoe pass. In this way, a noble metal/stainless steel/noble metal powder tri-layer may be formed in the die cavity 106. The tri-layer may be then compressed to form a porous stainless steel plate coated on both major surfaces by the noble metal.

In another embodiment, a different de-binding and sintering protocol may be used to obtain a continuous noble metal coating on the first major side 66a and on the second major side 66b of the anode gas diffusion layer 66 (e.g., see FIG. 3), while increasing the porosity of the porous stainless steel sheet. This may be accomplished by using a greater de-binding temperature ramp rate and/or a lower sintering temperature. In one embodiment, a relatively greater de-binding ramp rate may be in a range from approximately 1° C./min to approximately 5° C./min, for example, from approximately 2° C./min to approximately 4° C./min. In one embodiment, the relatively lower sintering temperature may be in a range from approximately 1100° C. to approximately 1300° C., such as from approximately 1150° C. to approximately 1250° C.

In another embodiment, the method of forming the anode gas diffusion layer 66 may include control of silicide formation. For example, some metal alloys form silicide phases during sintering (e.g., see J. D. Bolton, M. Youseffi & B. S. Becker (1998) Silicide Phase Formation and Its Influence on Liquid Phase Sintering in 316L Stainless Steel with Elemental Silicon Additions, Powder Metallurgy 41:2, (1998) 93-101, available at https://www.tandfonline.com/doi/abs/10.1179/pom.1998.41.2.93, which incorporated herein by reference in its entirety). For example, silicon addition to 316L stainless steel causes liquid silicide phase formation during sintering. The liquid silicide phases generate large pores in the stainless steel parts after sintering is completed.

In one embodiment, the powder metallurgy process may be carried out using a stainless steel powder 112 with a silicon content that is less than 0.1 weight percent silicon (e.g., 0 to 0.01 weight percent silicon). In this way, the substantial absence of silicon in the stainless steel powder 112 avoids or reduces formation of bulk stainless steel silicide phases and/or surface silicide phases. Thus, undesirable surface properties of the anode gas diffusion layer 66 may be avoided.

In another embodiment, silicide formation control may include a using stainless steel powder 112 with at least 1 weight percent silicon (e.g., 1 to 10 weight percent silicon) dispersed throughout the die cavity 106 in the powder metallurgy process used to form the anode gas diffusion layer 66. In this way, bulk silicide phases may be intentionally formed throughout a thickness of the anode gas diffusion layer 66 during sintering (e.g., liquid phase sintering). Such bulk silicide phases may act to increase pore formation. Thus, the porosity of the anode gas diffusion layer 66 may be increased by intentionally generating silicide-phase pores during sintering. The resulting bulk silicide phases may be distributed throughout the anode gas diffusion layer 66, and as such, may not be concentrated on the surface of the anode gas diffusion layer 66. In this way, undesirable surface effects due to surface silicide phases may be avoided or reduced.

Thus, in some embodiments, the porous stainless steel sheet may have a porosity that is in a range from approximately 40% to approximately 60%. The porous stainless steel sheet may have an average pore size of less than 5 microns or may have an average pore size of 1 to 3 microns. The anode gas diffusion layer may include a first major side that has a greater porosity than an opposite second major side of the porous stainless steel sheet. The first major side of the porous stainless steel sheet may be configured to face an anode side flow plate, and the second major side of the porous stainless steel sheet may be configured to face an anode. The first major side of the porous stainless steel sheet may have a porosity that is at least 10 percent greater than a porosity of the opposite second major side of the porous stainless steel sheet. In other embodiments, the porous stainless steel sheet may have continuous porosity gradient in which the porosity increases continuously from the first major side to the second major side. The porous stainless steel sheet may further include a noble metal coating. The porous stainless steel sheet may further include bulk and/or surface silicide phases.

It will be appreciated that the methods and systems described above are set forth by way of example and not of limitation. Numerous variations, additions, omissions, and other modifications will be apparent to one of ordinary skill in the art. In addition, the order or presentation of method operations in the description and drawings above is not intended to require this order of performing the recited operations unless a particular order is expressly required or otherwise clear from the context. Thus, while particular embodiments have been shown and described, it will be apparent to those skilled in the art that various changes and modifications in form and details may be made therein without departing from the scope of the disclosure.

The invention claimed is:

1. A method of manufacturing an anode gas diffusion layer for a proton exchange membrane (PEM) electrolyzer, comprising:
    forming three powder layers in a die cavity consisting of a noble metal powder, a mixture of stainless steel powder and lubricant, and another layer of the noble metal powder;
    compressing the three powder layers in the die cavity to form a green sheet;
    de-binding the green sheet; and
    sintering the green sheet to manufacture the anode gas diffusion layer for the PEM electrolyzer, wherein the anode gas diffusion layer includes a noble metal coating on a first side of the anode gas diffusion layer and on a second side of the anode gas diffusion layer.

2. The method of claim 1, wherein the stainless steel powder has a weight percentage of silicon that is less than 0.1%.

3. The method of claim 1, wherein the stainless steel powder has a weight percentage of silicon that is in a range from 1% to 10%.

4. The method of claim 1, wherein the mixture of the stainless steel powder and the lubricant has a continuous gradient of the lubricant such that the anode gas diffusion layer has a corresponding continuous porosity gradient.

5. The method of claim 1, wherein the mixture of the stainless steel powder and the lubricant has a stepwise distribution of the lubricant such that the anode gas diffusion layer has a corresponding stepwise distribution of porosity.

6. The method of claim 1, wherein the anode gas diffusion layer comprises a porous stainless steel sheet, wherein the porous stainless steel sheet has a porosity that is in a range from approximately 40% to approximately 60%.

7. The method of claim 6, wherein the porous stainless steel sheet has an average pore size of less than 5 microns.

8. The method of claim 6, wherein the porous stainless steel sheet includes at least one of bulk or surface silicide phases.

9. The method of claim 1, wherein the method is conducted in an inert atmosphere.

10. The method of claim 9, wherein the inert atmosphere includes a partial pressure of oxygen of less than 0.1 atm.

11. The method of claim 1, wherein the anode gas diffusion layer has a bubble point pressure of at least 10 psi.

* * * * *